(12) United States Patent
Norimatsu

(10) Patent No.: US 6,728,018 B2
(45) Date of Patent: Apr. 27, 2004

(54) LIGHT CONTROL DEVICE

(75) Inventor: Toshihide Norimatsu, Shiki (JP)

(73) Assignee: Japan Aviation Electronics Industry Limited, Tokyo (JP)

( * ) Notice: Subject to any disclaimer, the term of this patent is extended or adjusted under 35 U.S.C. 154(b) by 0 days.

(21) Appl. No.: 10/360,137

(22) Filed: Feb. 7, 2003

(65) Prior Publication Data

US 2003/0161021 A1 Aug. 28, 2003

(30) Foreign Application Priority Data

Feb. 22, 2002 (JP) .................................... 2002-045961

(51) Int. Cl.$^7$ ............................................. G02B 26/08
(52) U.S. Cl. ..................... 359/224; 359/223; 359/227
(58) Field of Search ................................ 359/223–224, 359/227, 196; 310/309; 385/18

(56) References Cited

U.S. PATENT DOCUMENTS

| 4,919,503 A | 4/1990 | Mroynski |
| 5,446,881 A | 8/1995 | Mammel, Jr. |
| 5,998,906 A | 12/1999 | Jerman et al. |
| 6,108,118 A | * 8/2000 | Minamoto .................. 359/224 |
| 6,303,885 B1 | 10/2001 | Hichwa et al. |

FOREIGN PATENT DOCUMENTS

| EP | 1033601 | 9/2000 |
| EP | 1245529 | 10/2002 |

* cited by examiner

*Primary Examiner*—James Phan
(74) *Attorney, Agent, or Firm*—David N. Lathrop, Esq.; Gallagher & Lathrop

(57) ABSTRACT

In an optical switch (an optical device) of the type in which a moving plate 31 is displaced to switch optical paths by displacement of mirrors 38 mounted on the moving plate 31, the moving plate 31 is supported at both ends to side beams 33 through paired support beams 32 extended from opposed side surfaces of the moving plate in parallel to its plate surface so that the moving plate 31 is displaced in a plane in which its plate surface lies; and the moving plate 31, the support beams 32, the side beams 33 and drive means 34, 35 for driving the moving plate are formed from one substrate.

21 Claims, 14 Drawing Sheets

PRIOR ART
FIG. 2
PRIOR ART
FIG. 3
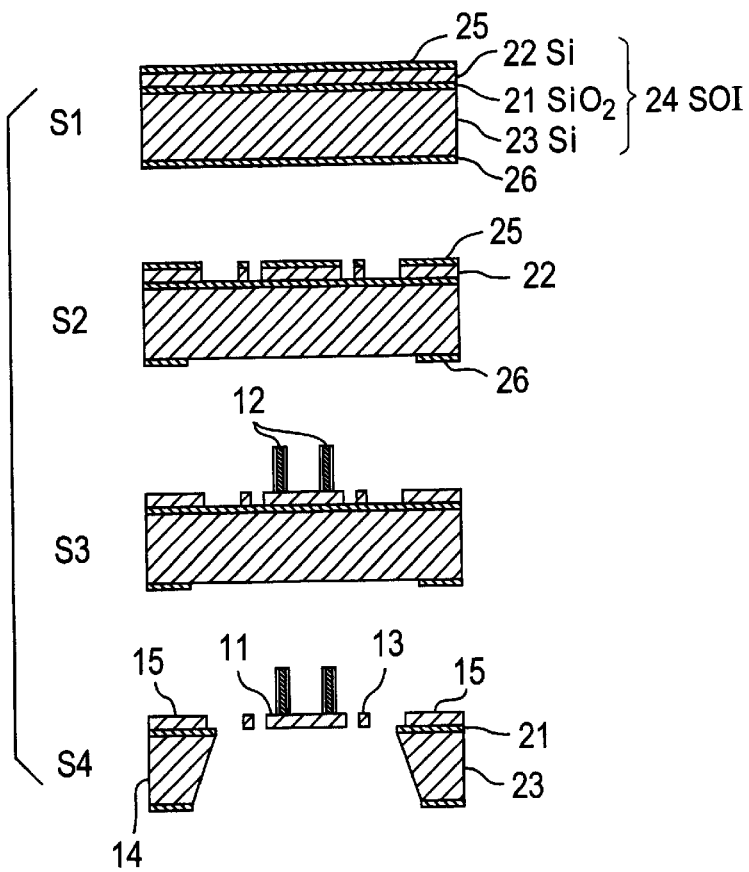
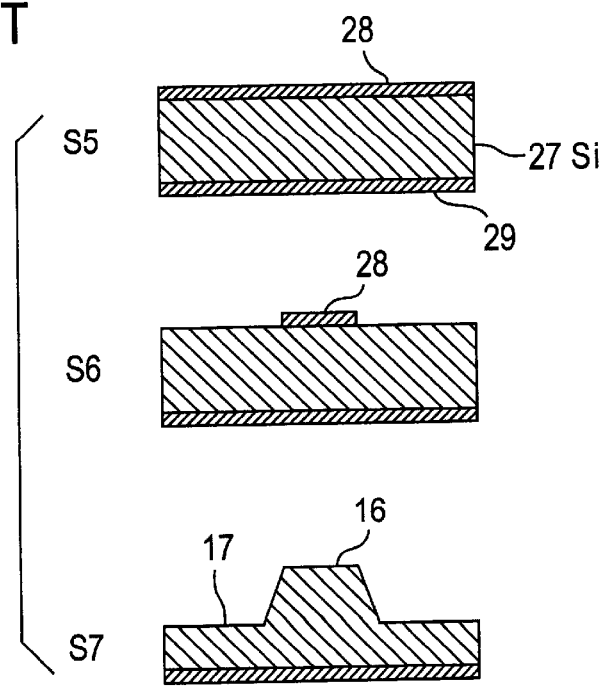

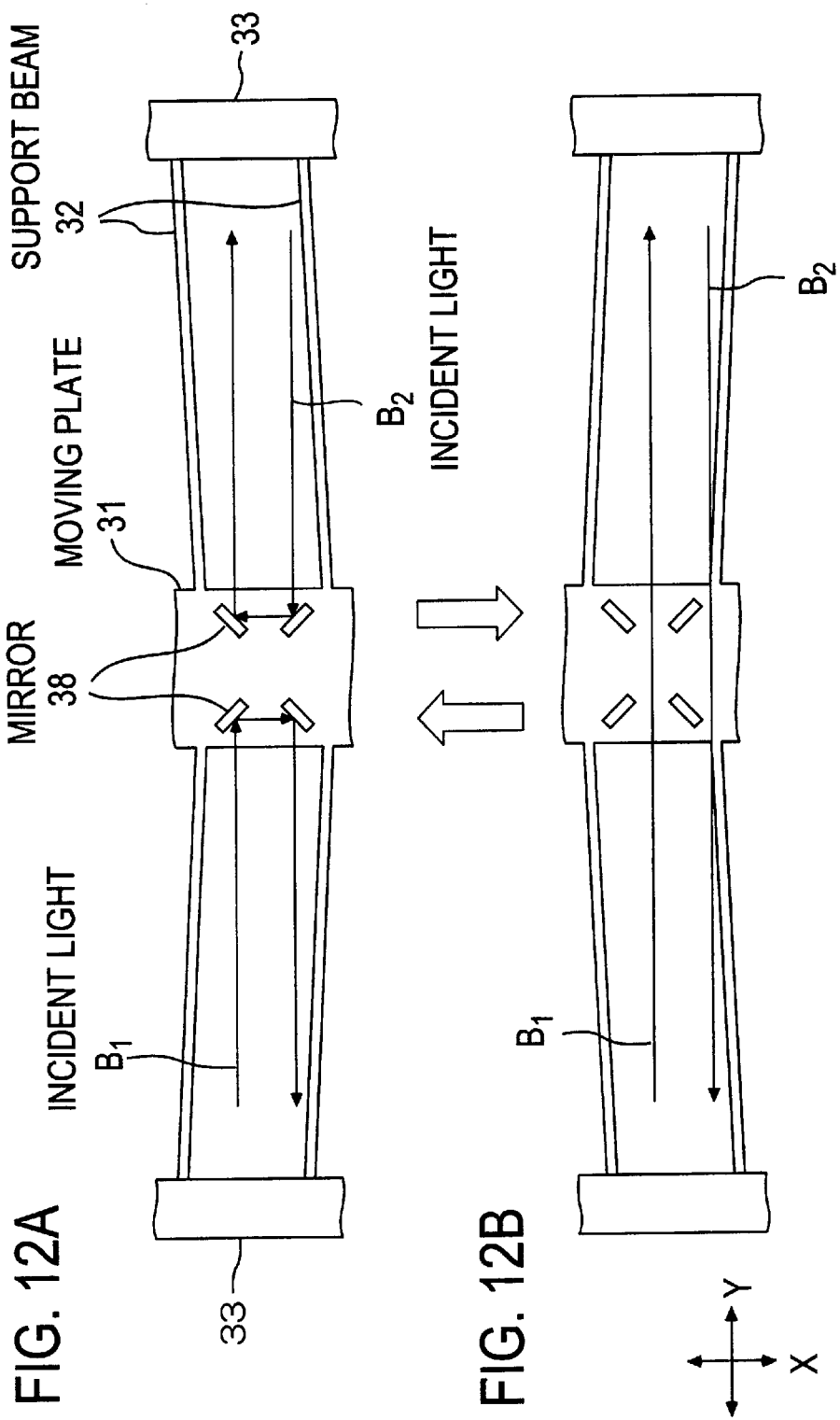

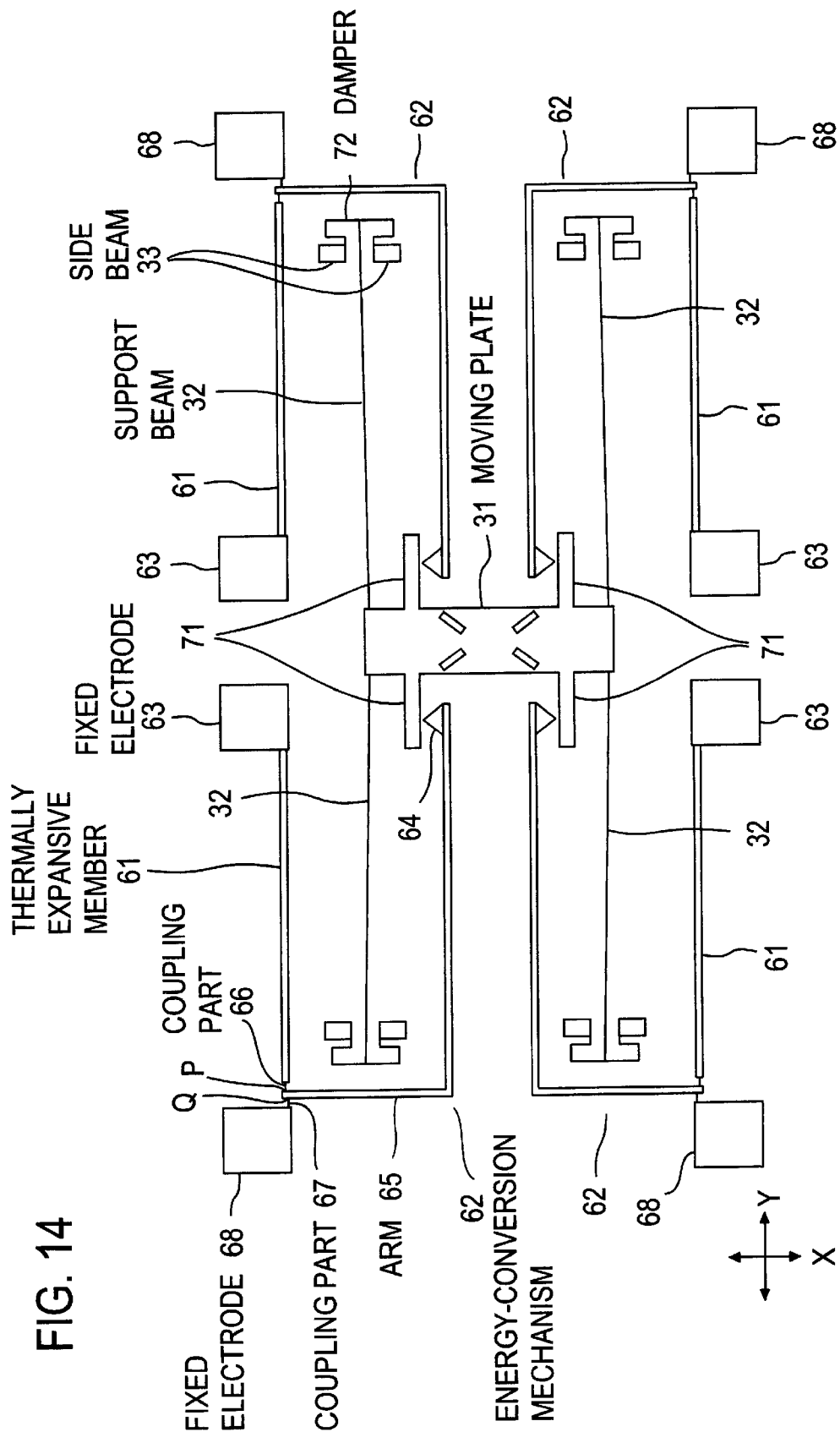

LIGHT CONTROL DEVICE

BACKGROUND OF THE INVENTION

The present invention relates to a light control device configured to switch an optical path or limit it (i.e., to control the quantity of light) by displacement of a moving plate and consequently a mirror or light shielding plate mounted thereon.

FIG. 1A shows the construction of an optical switch which is an example of a conventional light control device of this kind. The illustrated optical switch is a 2-by-2 optical switch for switching optical paths of two incoming rays $B_1$ and $B_2$ parallel to each other but opposite in direction.

On a moving plate 11 there are mounted four mirrors 12 as light control means. The mirrors 12 are disposed at an angle of 45 degrees with respect to the incoming rays $B_1$ and $B_2$, respectively, as depicted in FIG. 1A.

The moving plate 11 is supported by two support beams 13 in a manner to be displaceable in a direction vertical to the surface of the moving plate 11 itself. The support beams 13 are projected from a pair of opposed sides of the moving plate 11 of a square plate configuration, and are respectively extended around it along its three sides. The extended ends of the support beams 13 are fixedly coupled to stationary parts 15 on a frame 14 surrounding the moving plate 11.

Under the moving plate 11 is located a fixed electrode 16 at a predetermined spacing as shown in FIG. 1B, and a base 17 with which the fixed electrode 16 is formed integrally has its marginal portion joined to the frame 14. The moving plate 11 opposed to the fixed electrode 16 functions as a moving electrode.

In the optical switch of the above configuration, upon voltage application across the moving plate 11 and the fixed electrode 16, the moving plate 11 is attracted down by electrostatic power toward the fixed electrode 16, and upon removing the voltage, the moving plate returns to its initial position.

Accordingly, the optical switch is able to switch the optical paths by the mirrors 12 which undergo displacement as the moving plate 11 moves up and down. That is, when the moving plate 11 lies at the position indicated in FIG. 1B, the incoming rays $B_1$ and $B_2$ are reflected by the mirrors 12 to travel as indicated by the solid lines marked with the arrows, whereas when the moving plate 11 is at its lowered position, the mirrors 12 go out of the optical paths, allowing the incoming rays $B_1$ and $B_2$ to traveling in straight lines without being reflected by the mirrors 12.

FIGS. 2 and 3 show a sequence of steps involved in the manufacture of the above optical switch. The optical switch is manufactured using two base plates or substrates. Steps S1 to S4 in FIG. 2 show steps of processing the upper substrate, and steps S5 to S7 in FIG. 3 show steps of processing the lower substrate.

The upper substrate is, in this example, a multi-layered SOI (Silicon On Insulator) substrate 24 with a $SiO_2$ layer 21 sandwiched between silicon (Si) layers 22 and 23 as depicted in FIG. 2. The manufacturing process will be described below step by step.

Step S1: The SOI substrate 24 are coated all over its top and bottom surfaces with thermally oxidized films 25 and 26, respectively.

Step S2: Patterns for the moving plate, the support beams and the stationary parts are formed by photolithography over the thermally oxidized film 25 on part of the top surface, then the thermally oxidized film 25 is selectively etched away as patterned, and the Si layer 22 is selectively etched away using the thermally oxidized film pattern as a mask. On the other hand, a frame pattern is formed by photolithography over the thermally oxidized layer 26, and the thermally oxidized film 26 is selectively etched away as patterned.

Step S3: The thermally oxidized film 25 remaining on the part of the top surface is etched away, and a thick resist film is coated over the entire area of the top surface and patterned to form mirror bodies, which are coated all over its surface area with an Au film to form the mirrors 12.

Step S4: The Si layer 23 on the side of the bottom surface is selectively etched away, and the $SiO_2$ layer 21 is selectively etched away to form the frame 14. As a result, two stationary parts 15 are positioned on the $SiO_2$ layer of the frame 14 composed of the Si layer 2 and the $SiO_2$ layer 21, and the moving plate 11 carrying the mirrors 12 is supported by the stationary parts 15 through the support beams 13.

On the other hand, an Si substrate 27 is used as the lower substrate. Referring to FIG. 3, the manufacturing process will be described below step by step.

Step S5: The Si substrate 27 is coated all over its top and bottom surfaces with thermally oxidized films 28 and 29, respectively.

Step S6: A fixed electrode pattern is formed by photolithography over the thermally oxidized film 28, and the thermally oxidized film 28 is selectively etched away as patterned.

Step S7: The substrate 27 is etched away as predetermined using the pattern of the thermally oxidized film 26 as a mask, after which the thermally oxidized film 28 are etched away. As a result, the upwardly protruded fixed electrode 16 is formed on the base 17.

The Si substrate 27 and the SOI substrate 24 thus obtained are integrated into a single-piece structure with the frame 14 fixedly mounted on the base 17 by bonding, for instance. In this way, the optical switch shown in FIGS. 1A and 1B is manufactured.

In such a conventional a light control device as the above-described optical switch of the construction in which the moving plate is used as a moving electrode and displaced by electrostatic driving to switch or limit optical paths by displacement of the mirrors or light shielding plates mounted on the moving plate, the moving plate is drive in its widthwise direction, that is, in the direction vertical to the plate surface.

Accordingly, the fixed electrode for electrostatic driving of the moving plate needs to be disposed opposite the moving plate surface, but it is difficult to obtain from one substrate the moving plate (the moving electrode) and the fixed electrode bearing such a positional relationship to each other. On this account, it is conventional to produce them separately using two substrates and integrate them as by bonding.

Hence, the prior art manufacturing method involves patterning by photolithography and etching for each of the two substrate and necessitates their integration (by bonding) into a unitary structure; hence, these works inevitably increase the number of man-hours, making the manufacture of the light control device complicated and time-consuming.

SUMMARY OF THE INVENTION

It is therefore an object of the present invention to provide a light control device that can be manufactured with a smaller number of man-hours and with high accuracy.

The light control device according to the present invention comprises:

side beams;

a moving plate having opposed side surfaces;

at least one pair of support beams extended in opposite directions from said opposed side surfaces of said moving plate in parallel relation to said moving plate and having its tip ends fixed to said side beams, respectively, to support said moving plate in a manner to be elastically displaceable in a plane in which the plate surface of said moving plate lies;

drive means for driving said moving plate relative to said side beams in said plane in which said plate surface lies; and light control means mounted on said moving plate, for controlling incident optical beams in accordance with the displacement of said moving plate by said drive means;

wherein said moving plate, said support beams, said side beams and said drive means are formed by etching one substrate.

Said drive means may be formed moving planar electrodes extended from sad side surfaces of said moving plate and a fixed planar electrode disposed opposite said moving comblike electrodes in common to them.

Alternatively, said drive means may be formed by moving comblike electrodes extended from sad side surfaces of said moving plate and a fixed comblike electrode disposed opposite said moving comblike electrodes in common to them.

The above light control device may have a construction in which: said paired support beams are extended from said side surfaces of said moving plate at a predetermined angle of inclination thereto and symmetrically arranged in respect to the center line parallel to the said direction of displacement of said moving plate; said drive means is disposed on either side of said moving plate in direction of displacement of said moving plate; and said paired support beams are driven by said drive means into snap action.

The above light control device may have a construction in which: said paired support beams are extended from said side surfaces of said moving plate at a predetermined angle of inclination thereto and symmetrically arranged in respect to the center line parallel to the direction of displacement of said moving plate; said drive means comprises plural sets of a thermally expansive member and an energy-conversion mechanism for converting thermal expansion of said thermal expansive member into a pressure in said direction of displacement of said moving plate, said drive means being capable of applying forward and backward pressures to said moving plate; and, on said moving member being pressed by said energy-conversion mechanism, said support beams performs snap action to drive and displace said moving plate.

The above light control device may have a construction in which: said light control means may be formed by mirrors to change optical paths of said incident optical beams; or said light control means may be formed by light shielding plates whose transmittance varies in the direction of displacement of said moving plate to control the amounts of incident optical beams transmitted.

Furthermore, in the above light control device said drive means may be formed by moving planar electrodes extended from said opposed side surfaces of said moving plate and a fixed planar electrode disposed opposite said moving planar electrode, or by moving comblike electrodes extended from said side surfaces of said moving plate and a fixed comblike electrode disposed opposite said moving comblike electrodes.

In the above optical control device, said substrate may be one of silicon layers of a multi-layered $SiO_2$ substrate deposited all over its both sides with silicon layers, and grooves for fixedly receiving optical fibers may be cut in the other of said silicon layers.

BRIEF DESCRIPTION OF THE DRAWINGS

FIG. 2 is a diagram showing a sequence of steps involved in the first half of the manufacturing process of the optical switch depicted in FIGS. 1A and 1B;

FIG. 3 is a diagram showing a sequence of steps involved in the second half of the manufacturing process of the optical switch;

FIG. 12A is a diagram showing the one optical path switching operation of the optical switch depicted in FIG. 9;

FIG. 12B is a diagram showing the other optical path switching operation;

FIG. 14 is a plan view of the FIG. 13 embodiment;

DETAILED DESCRIPTION OF THE PREFERRED EMBODIMENTS

A description will be given, with reference to the accompanying drawings, of embodiments of the present invention.

Figure 1A:
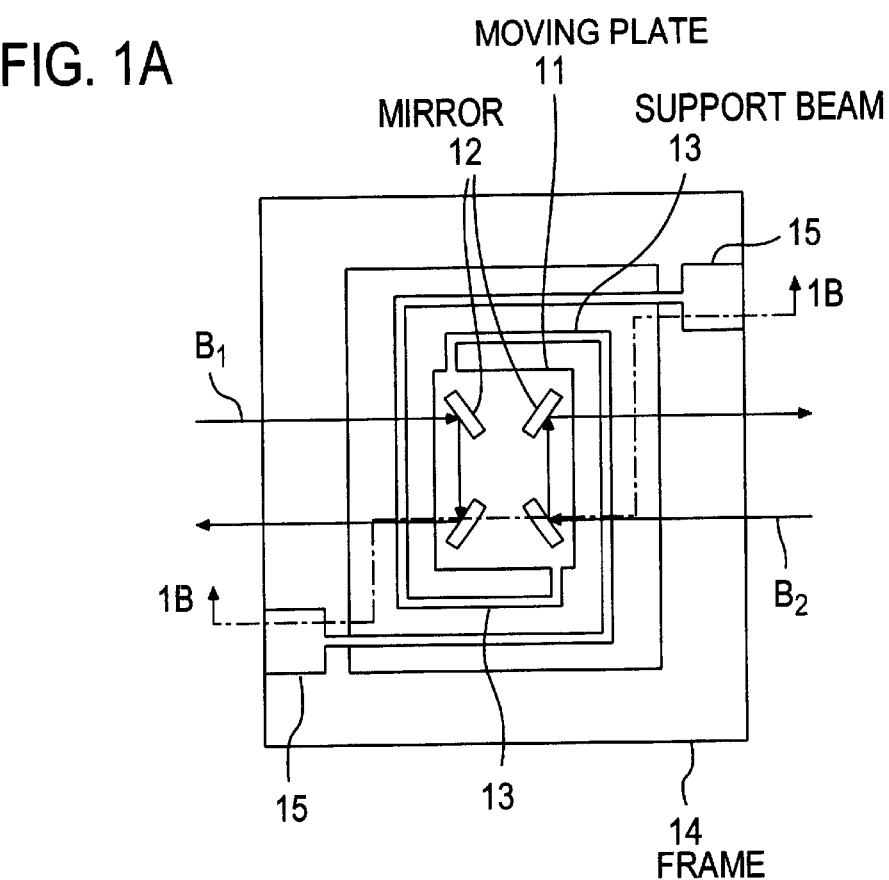
FIG. 1A is a plan view showing the construction of a conventional optical switch.
Figure 1B:
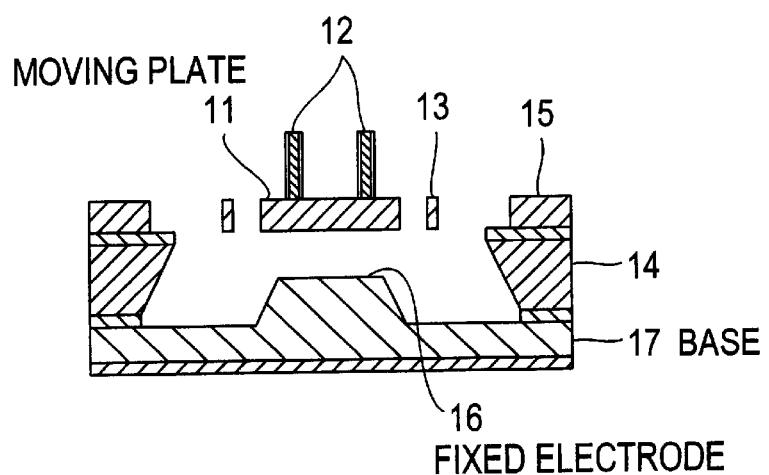
FIG. 1B is a sectional view taken along the line 1B—1B in FIG. 1A.
Figure 4:
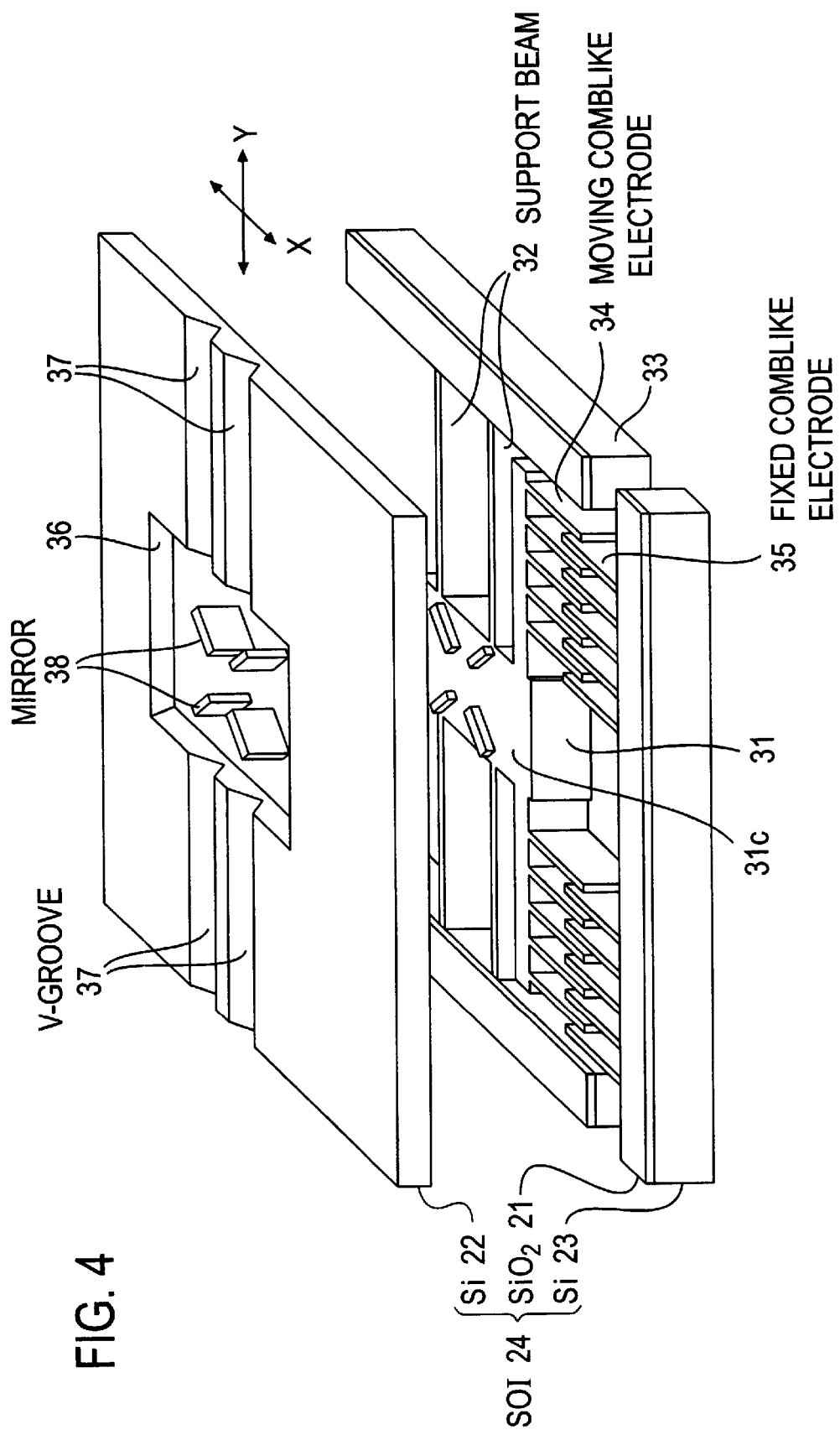
FIG. 4 is an exploded perspective view illustrating an embodiment of the present invention.

FIG. 4 is a diagrammatic showing of an optical switch structure as an embodiment of the light control device of the present invention. In this embodiment, the optical switch is a 2-by-2 optical switch as is the case with the conventional optical switch depicted in FIGS. 1A and 1B, and the switch is formed by a multi-layered SOI substrate 24 with an SiO₂ layer sandwiched between Si layers 22 and 23. Incidentally, in FIG. 4 the part formed by the upper Si layer 22 is shown separately of the SiO₂ layer 21.

Figure 5:
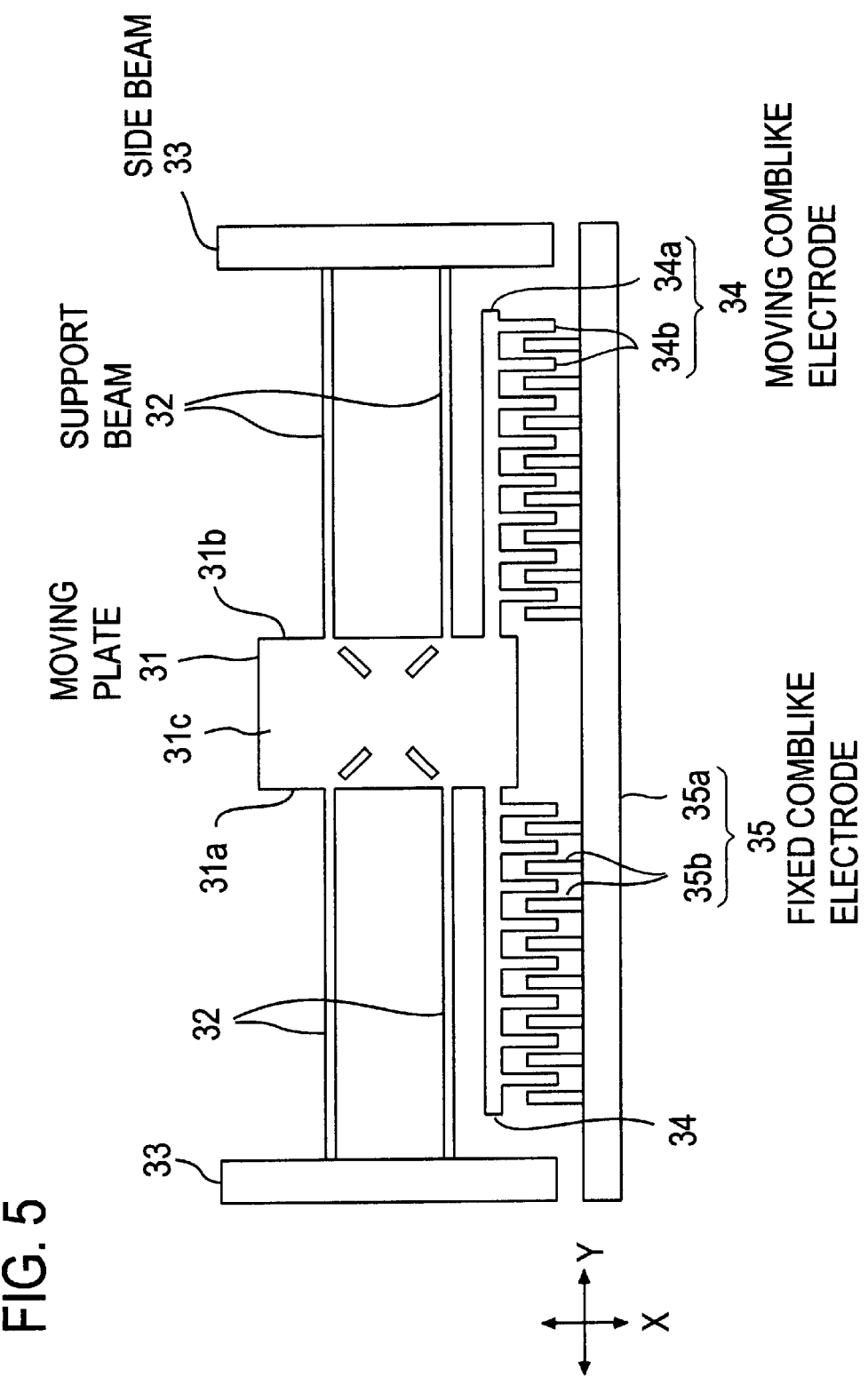
FIG. 5 is a plan view showing the construction of the part formed by the lower Si layer in FIG. 4.

FIG. 5 is a top plan view of the structure of the portion formed by the lower Si layer 23, which will be described first.

A moving plate 31 has a square plate-like structure, and narrow support beams 32 are extended in pairs in opposite directions from the opposite sides 31a and 31b of the moving plate 31 in alignment with each other. The support beams 32 are extended in parallel to the top surface 31c of the moving plate 31 and at right angles to the side surfaces 31a and 31b thereof. In this example two support beams 32 are extended from either one of the side surfaces 31a and 31b; that is, two pairs of support beams 32 are used.

The support beams 32 have their extended ends fixedly coupled to side beams 33 disposed at right- and left-hand sides, and consequently, the moving plate 31 is supported at its both ends by the side beams 33 through the two pairs of support beams 32 in a manner to be displaceable in the X-direction. In the following description, as indicated in FIG. 5, the direction parallel to the top surface 31 and side surfaces 31a and 31b of the moving plate 31 will be called the X-direction and the direction perpendicular to the side surfaces 31a and 31b will be called the Y-direction.

Moving comblike electrodes 34 are extended in the Y-direction from the both side surfaces 31a and 31b of the moving plate 31 near its one end in the X-direction. The comblike electrodes 34 are each composed of a base portion extended in the Y-direction and comb teeth 34b projecting in the X-direction from the base portion 34a at regular intervals in the Y-direction.

A fixed comblike electrode 35 disposed opposite the both moving comblike electrodes 34 is composed of a base portion 35a extended in the Y-direction and comb teeth 35b projecting in the X-direction from the base portion 35a at regular intervals in the Y-direction. The moving comblike electrode 34 and the fixed comblike electrode 35 are arranged with their comb teeth 34b and 35b in meshing engagement just like an interdigital electrode. In this example the movable and fixed comblike electrodes 34 and 35 constitute drive means for displacement of the moving plate 31 in the X-direction by electrostatic driving.

On the other hand, the upper Si layer 22 has, as shown in FIG. 4, a centrally located opening 36 and two pairs of V-grooves 37 extended in the Y-direction from opposite sides of the opening 36 for fixedly receiving optical fibers. In the V-grooves 37, though not shown in FIG. 4, optical fibers each carrying a lens at one end thereof, for instance, are fixedly mounted in alignment with each other.

Four mirrors 38, located in the opening 36 to serve as light control means, have their bodies formed by the Si layer 22 and mounted through a SiO₂ layer 21 on the moving plate 31 formed by the Si layer 23. The mirrors 38 are each arranged at an angle of 45 degrees with respect to incident light.

Figure 6:
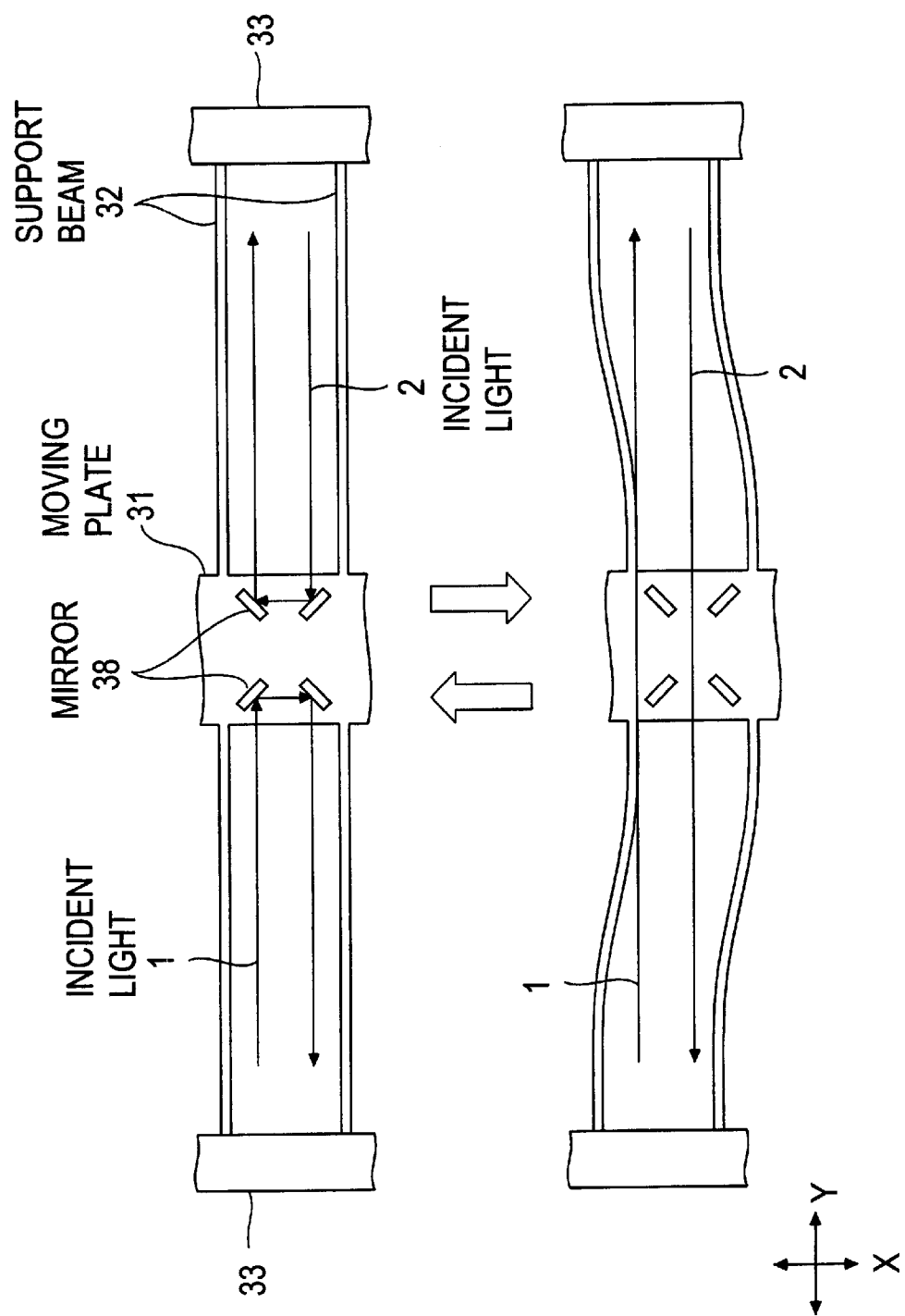
FIG. 6A is a diagram depicting an optical path switching operation of the optical switch shown in FIG. 4.
FIG. 6B is a diagram depicting another optical path switching operation of the optical switch shown in FIG. 4.

FIGS. 6A and 6B show how to switch optical paths in the optical switch of the above-described construction. By application a voltage across the moving and fixed comblike electrodes 34 and 35 in the state of FIG. 6A, the moving comblike electrode 34 is attracted by electrostatic force to the fixed comblike electrode 35, flexing the support beams 32 and hence displacing the moving plate 31 in the X-direction and switching the optical paths as depicted in FIG. 6B.

Figure 7:
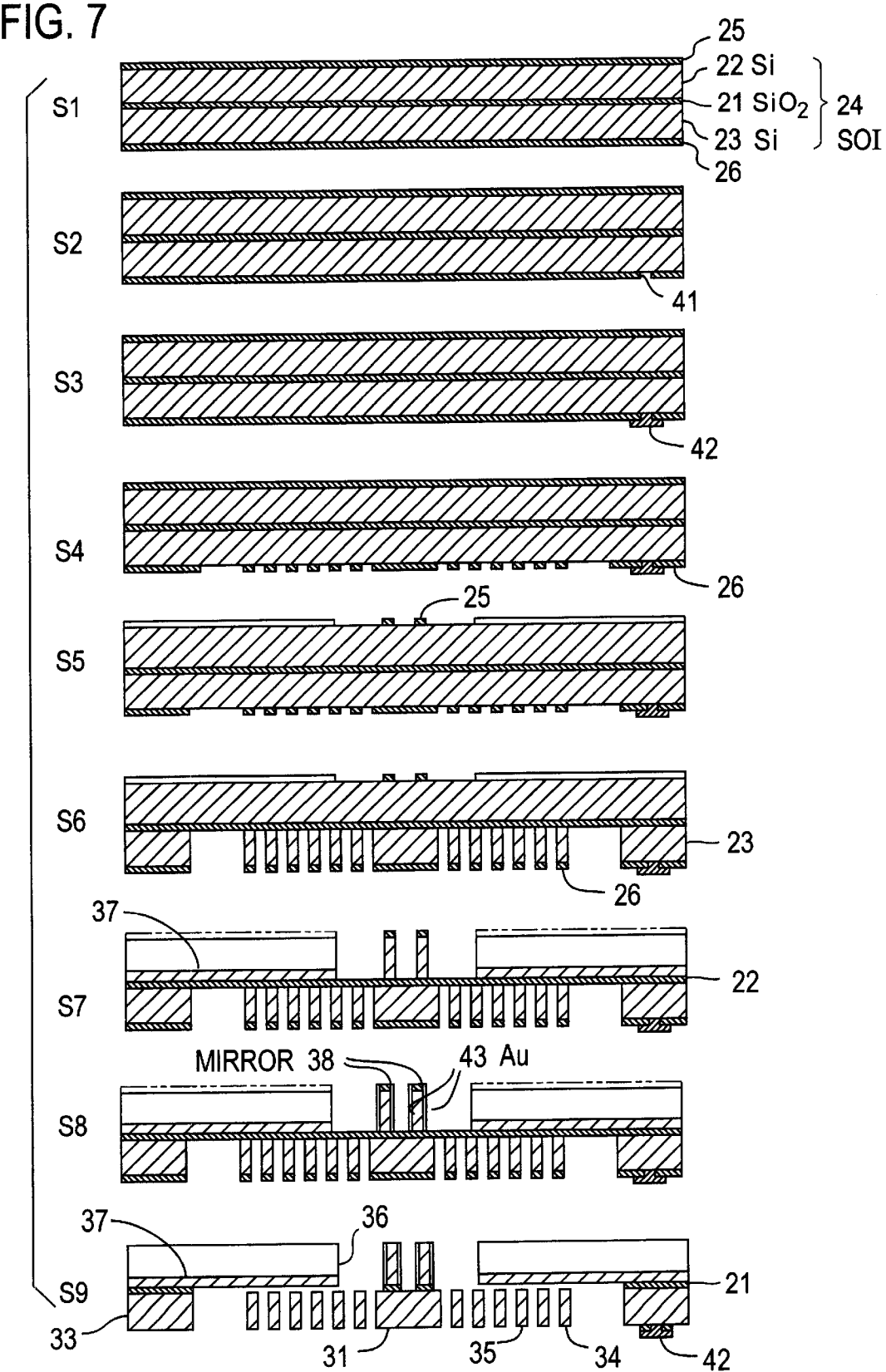
FIG. 7 is a diagram illustrating a sequence of steps involved in the manufacture of the optical switch shown in FIG. 4.

Next, a description will be given, with reference to FIG. 7, of a sequence of steps S1 to S9 involved in the manufacture of the optical switch of this embodiment. Incidentally, the Si layer 23 shows the section of each of the comb teeth 34b and 35b, and the Si layer 22 shows the section of the V-groove 37.

Step S1: The thermally oxidized films 25 and 26 are formed all over the top and bottom surfaces of the SOI substrate 24, respectively.

Step S2: A through hole 41 is formed by photolithography and etching through the bottom-side thermally oxidized film 26 at a predetermined place.

Step S3: An Au/Cr two-layer film is formed over the entire area of the bottom surface, and selectively etched away in the form of an electrode pad. Though not shown in FIGS. 4 and 5, the electrode pad 42 is provided on each side beam 33 and the base portion 35a of the fixed comblike electrode 35.

Step S4: Patterns for the moving plate, the support beams, the side beams, the moving comblike electrode and the fixed comblike electrode are formed by photolithography all over the thermally oxidized film 26, after which the bottom-side thermally oxidized film 26 is selectively away as patterned.

Step S5: Patterns for the optical fiber receiving V-grooves, the opening and mirrors are formed by photolithography all over the top-side thermally oxidized film 25, after which the thermally oxidized film 25 is selectively away as patterned.

Step S6: The bottom-side Si layer 23 is selectively removed by deep dry etching, using the thermally oxidized film pattern 26 as a mask.

Step S7: The top-side Si layer 22 is selectively removed by KOH wet etching, using the thermally oxidized film pattern 25 as a mask.

Step S8: The mirror bodies are coated all over their surfaces with an Au film 43 to form the mirror 38.

Step S9: The remaining SiO₂ layer is selectively removed by wet etching except the SiO₂ layer 21 overlying the side beams 33 and the base portion 35a of the fixed comblike electrode 35, the SiO2 layer 21 underlying each mirror 38 and the thermally oxidized film 26 of each electrode pad portion 42. In this way, the optical switch of FIG. 4 is obtained.

As described above, in this example, the moving plate 31 is driven in parallel to its top surface 31c to switch the optical paths, and the moving plate 31 supported by the support beams 32 and the drive means composed of the moving and fixed comblike electrodes 34 and 35 for driving and displacing the moving plate 31 are formed by a single photolithography-etching process of one substrate.

Accordingly, the optical switch of this example can be manufactured with a smaller number of man-hours than in the manufacture of the conventional optical switch of the construction that uses two substrates and drives the moving plate to displace in the direction vertical to the plate surface.

Further, since the fixed and moving comblike electrodes forming the drive means for electrostatic driving the moving plate can be formed simultaneously (by photolithography-etching), they can be formed with high accuracy—this permits easy fabrication of high-precision comblike electrodes which mesh with each other as described above.

In this example the substrate for forming the moving plate and the drive means is a silicon substrate, which is the one Si layer of the SOI substrate, and the other Si layer is used for forming the V-grooves and the mirrors; accordingly, the moving plate, the V-grooves and the mirrors, which are arranged three-dimensionally can be miniaturized with ease.

Figure 8:
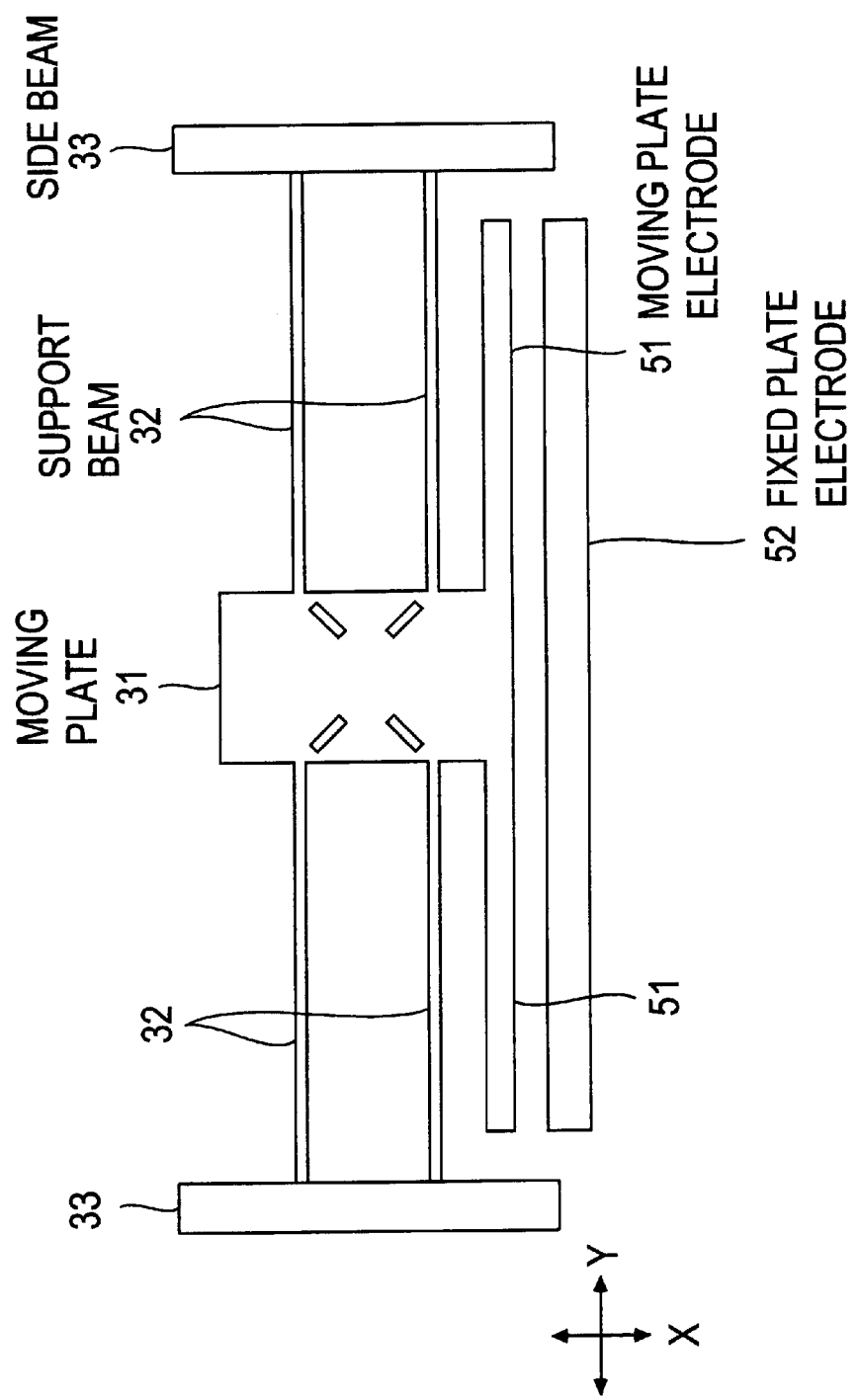
FIG. 8 is a diagram for explaining another embodiment of the present invention.

FIG. 8 schematically illustrates a modified form of the above embodiment, in which the moving and fixed comblike electrodes 34 and 35 are replaced with moving and fixed planar electrodes 51 and 52 which are disposed opposite each other to form the means for driving the moving plate 31.

In this case, when the Van der Waals force resulting from the contact between the moving and fixed planar electrodes is larger than the elastic restoring force of the support beams 32, the electrodes stick fast together (a phenomenon that the moving electrode will not restore to its initial position even if the applied voltage is removed). To avoid this, it is necessary to perform non-contacting drive of the moving electrode by applying voltage within a range that the moving electrode is not brought into contact with the fixed electrode. In this instance, the moving and the fixed electrodes need to be spaced apart more than 3D, i.e. more than three times the electrode driving distance D necessary for switching the optical paths of optical beams, in which case the voltage necessary for driving the moving electrode by the distance D is as high as about 5.2 times the voltage needed for contacting drive.

In contrast thereto, the comblike opposed electrode structure is very advantageous in easy position control, non-contacting drive and low voltage consumption.

While in the above the present invention has been described as being applied to the optical switch of the type in which the mirrors mounted on the moving plate are displaced by electrostatic drive of the moving plate to switch the optical paths, the invention is not limited specifically to such an optical switch and the displacement of the mirrors. For example, the invention is applicable as well to a light control device like a so-called variable optical attenuator (VOA) in which light shielding plates, whose transmittance varies continuously or on a stepwise basis in the X-direction, are mounted as light control means on a moving plate and the light shielding plates are displaced in the X-direction to thereby control the optical paths (to control the amounts of light passing through the shielding plates).

Incidentally, since the above-described drive means using electrostatic force holds the moving plate in its displaced position only during the voltage application, continued application of voltage is needed to hold optical paths with the moving plate displaced. This presents a problem that the optical paths cannot be maintained upon occurrence of a trouble on the part of the drive power supply, such as a power failure.

Figure 9:
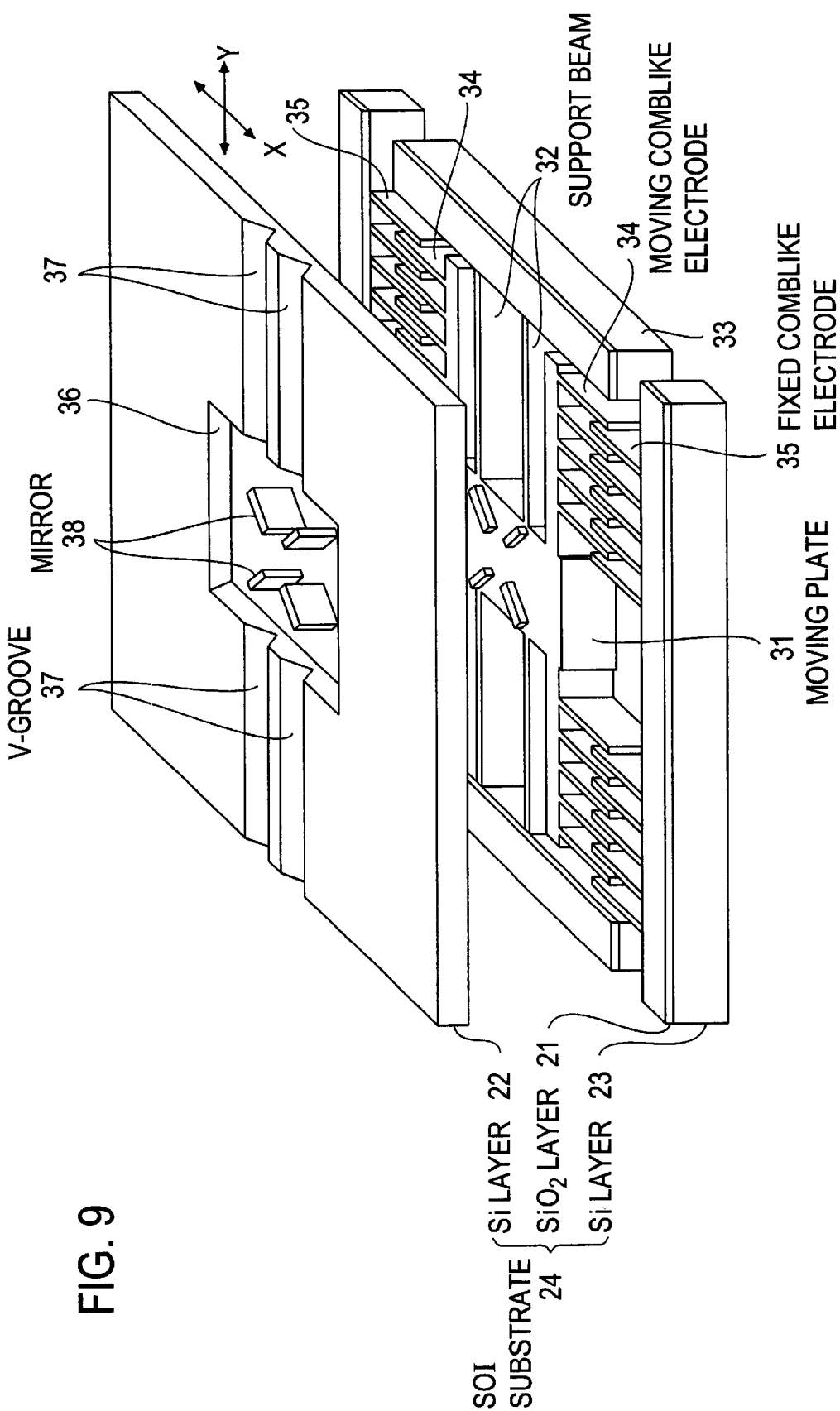
FIG. 9 is a perspective view, partly separated, of another embodiment of the present invention.
Figure 10:
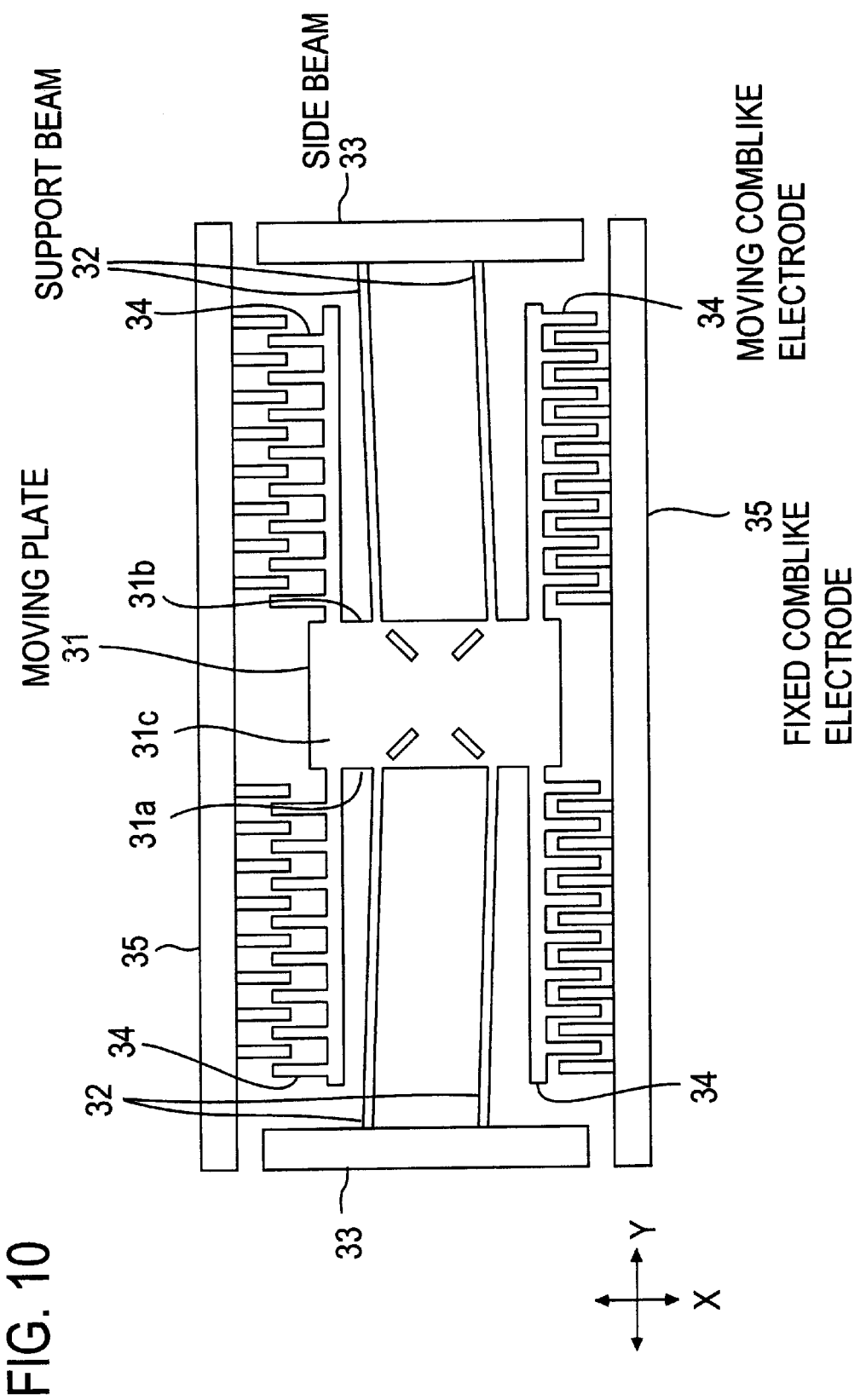
FIG. 10 is a plan view showing the construction of the part formed by the lower Si layer in FIG. 9.

FIGS. 9 and 10 illustrate a modified form of the FIGS. 4–5 embodiment which is equipped with a function of holding the moving plate in position (hereinafter referred to as a latch function).

In this example, as depicted in FIG. 10, the two pairs of support beams 32 are extended at a predetermined angle of inclination to the side surfaces 31a and 31b of the moving plate 31 and the two pairs of support beams 32 are symmetrically arranged in respect to the center line of the moving plate 31 parallel to the X-direction.

That is, this embodiment has a bi-stable structure in which such tilting of the support beams 32 provides a peak in the energy that are stored in the support beams 32 in accordance with their displacement.

Figure 11A:
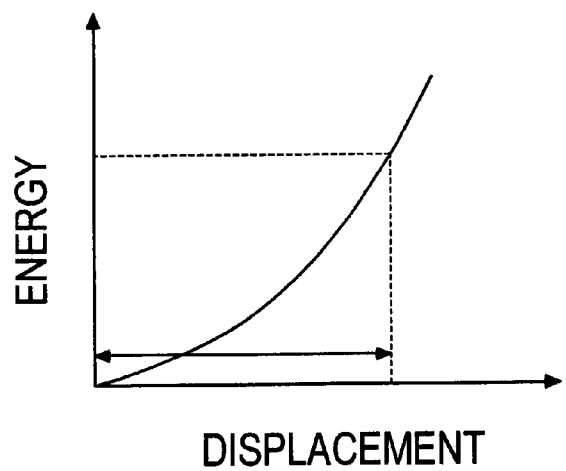
FIG. 11A is a graph showing the relationship between the displacement of the support beam and the energy gathered therein in the case of FIG. 5 embodiment.

As shown in FIG. 11A, in the case of the support beams disposed in parallel to the Y-direction, the energy that is stored in each support beam monotonously increases and decreases with an increase and a decrease in the displacement in the X-direction. To maintain desired displacement of such a support beam, it is necessary to keep on applying energy that balances with the energy of the support beam at its current position.

Figure 11B:
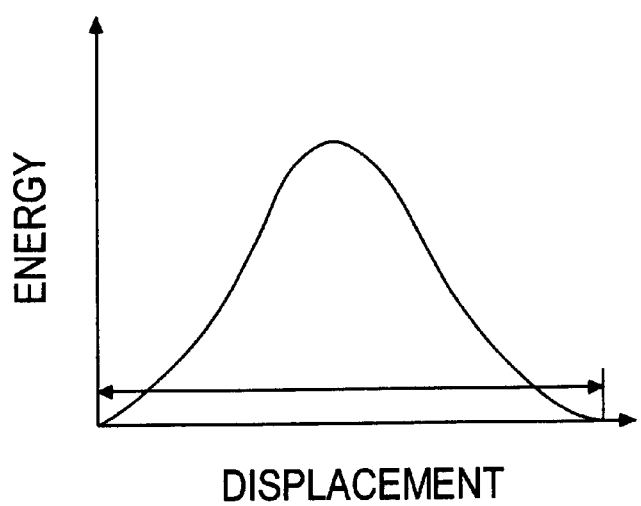
FIG. 11B is a graph showing the relationship between the displacement of the support beam and the energy gathered therein in the case of FIG. 9 embodiment.

In contrast thereto, in the case of the support beams inclined to the Y-direction, the energy that is stored in each support beam has a peak with respect to an increase and a decrease in the displacement as shown in FIG. 11B. In this case, once supplied from the outside with energy just a little larger than the peak, the support beam stays at a certain position even if the external energy application is stopped. That is, such an energy application displaces the support beam to a predetermined position through snap action and holds it there stably.

Incidentally, forward and backward forces (electrostatic attractive forces) are required for the X-direction displacement of the moving plate 31 through the snap action of the support beams disposed at a predetermined angle of inclination. To meet this requirement, in the FIGS. 9–10 embodiment drive means composed of the moving and fixed comblike electrodes 34 and 34 is disposed as well on the side of the moving plate 32 opposite the afore-described drive means in the X-direction.

FIGS. 12A and 12B show how the moving plate 31 is driven for displacement by the drive means disposed on either side of the moving plate 31 in the X-direction to switch optical paths.

Although the above has described the constructions in which the drive means is formed by opposed electrodes and the moving plate is driven by electrostatic force, the moving plate can be displaced as well through utilization of other force than the electrostatic one as described below.

Figure 13:
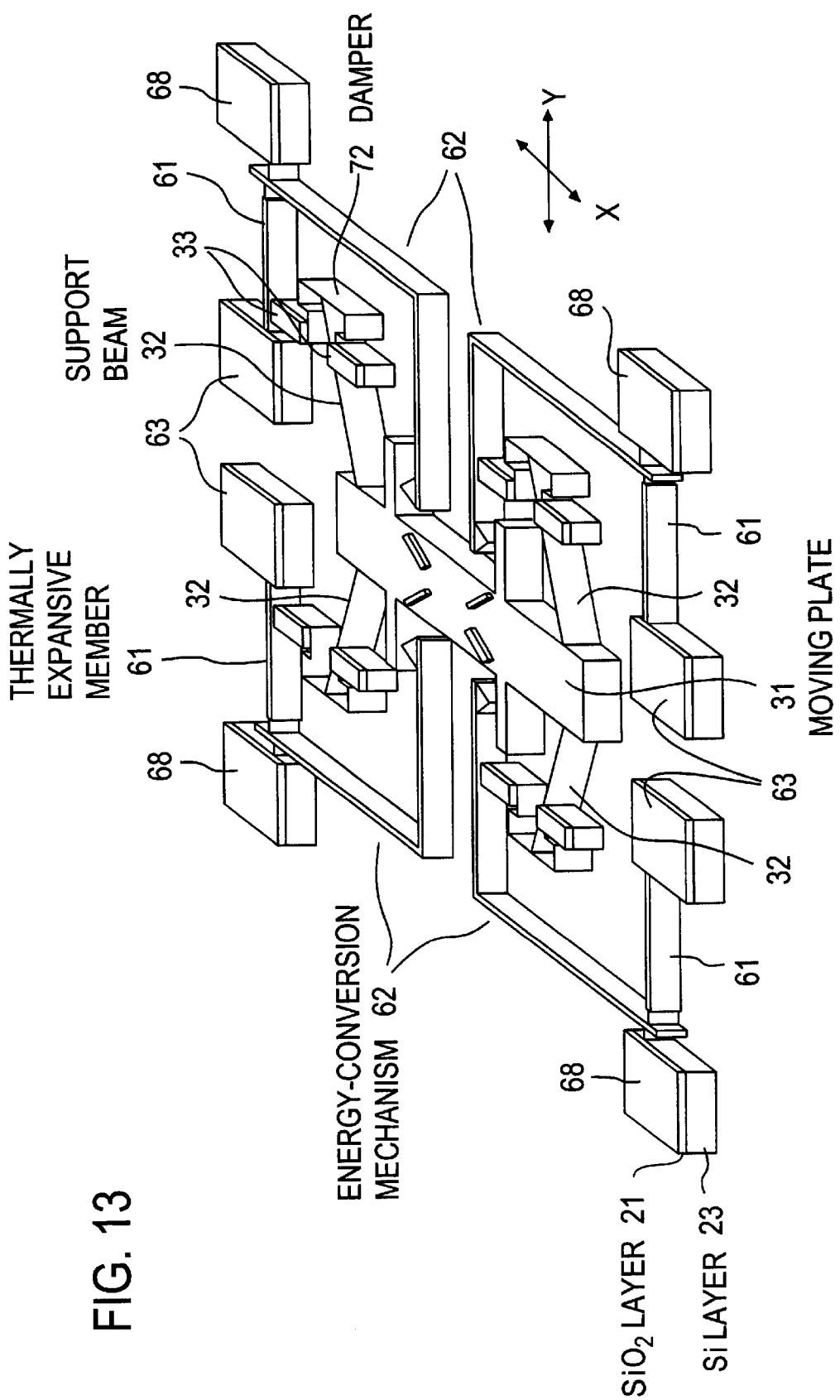
FIG. 13 is a perspective view, partly taken away, of another embodiment of the present invention.

FIGS. 13 and 14 illustrate an optical switch provided with drive means which utilizes thermal expansion. In this example, as is the case with the FIGS. 9–10 embodiment, the support beams 32 are inclined in respect of the Y-direction and adapted for snap action. In FIG. 13 there is not shown the part which is formed by the upper Si layer 22 of the SOI substrate in FIG. 9. And, FIG. 14 is a top plan view of the structure formed by the lower Si layer 23 depicted in FIG. 13.

Referring to FIG. 14, the construction of the drive means will be described below.

In this example the drive means for driving the moving plate 31 comprises four sets of thermally expansive members 61 and energy-conversion mechanisms 62 for converting thermal expansion of the thermally expansive members 61 into pressures in the X-direction. With this configuration, forward and backward pressures by the two pairs of opposed drive means can be applied in the X-direction to the pressing parts 71 projecting in the Y-direction from the both side surfaces 31a and 31b of the moving plate 31.

Each thermally expansive member 61 is extended in the Y-direction and fixedly connected at its base end to one fixed electrode 63.

The energy-conversion mechanisms 62 each comprise an L-shaped arm carrying at its tip a pressing projection 64 and very narrow coupling portions 66 and 67 protrusively provided on both sides of the base end portion of the arm 65 at positions slightly displaced in the X-direction. The one coupling portion 66 is connected to the tip of the thermally expansive member 61, whereas the other coupling portion 67 is fixed to a fixed electrode 68. Incidentally, the portion P of the arm 65 on which the coupling portion 67 is protrusively provided serves as a point of force and the portion Q on which the coupling portion 67 is protrusively provided functions as a fulcrum.

With the drive means of the above construction, upon voltage application across the fixed electrodes 63 and 68 to feed current to the thermally expansive member 61, the resulting Joule's heat expands the thermally expansive member 61.

The point of force P is pressed by the thermal expansion of the member 61, and consequently, the arm 65 turns about the fulcrum Q, and the projection 64 is displaced substantially in the X-direction, pushing the pressing part 71 projecting from the moving plate 31.

Figure 15A:
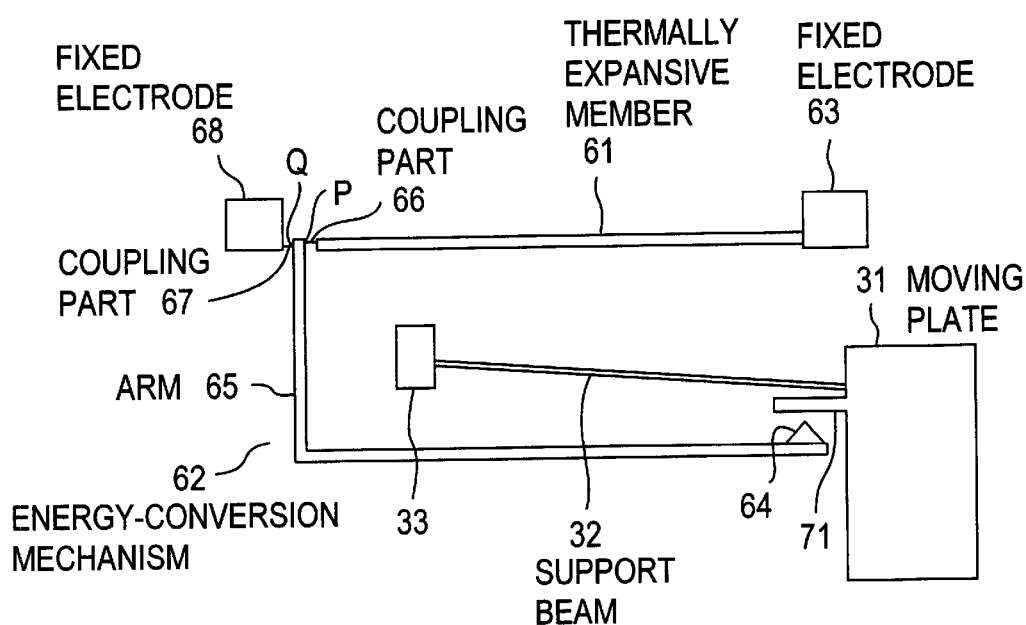
FIG. 15A is a partial plan view for explaining the state in which the moving part of the FIG. 13 optical switch is displaced in one direction by electrostatic driving.
Figure 15B:
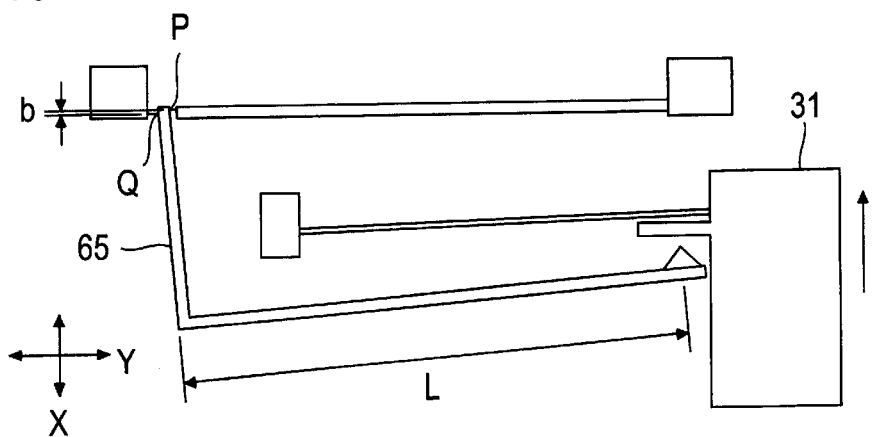
FIG. 15B is a partial plan view for explaining the state in which the moving part of the FIG. 13 optical switch is displaced in the other direction by electrostatic driving.

As a result, the support beam 32 performs snap action to shift from the state shown in FIG. 15A to the state in FIG. 15B, by which the moving plate 13 is displaced.

In the case of displacing the moving plate 31 in the direction opposite to the above, voltage is applied across the fixed electrodes 63 and 68 on the side for pressing the moving plate 31 in the opposite direction.

Letting b represent the distance between the fulcrum Q and the point of force P and L represent the length of the side of the L-shaped arm 65 on which the projection 64 is protrusively provided, the displacement of the projection 64 is a large value corresponding to L/b for the amount of thermal expansion a of the thermally expansive member 61.

In this example, the support beams 32 are each fixed to the side beam 33 through a damper 72—this allows more ease in the snap action of the support beam 32.

Effect of the Invention

As described above, according to the present invention, the moving plate is displaced in parallel to the plate surface, and the drive means for the displacement of the moving plate is formed of the same substrate as the moving plate; hence, they can be formed simultaneously by a single photolithography-etching process.

Accordingly, the present invention makes it possible to manufacture, with a small number of man-hours but with high accuracy, a light control device, such as an optical switch or variable optical attenuator, in which the moving plate is displaced to perform switching of optical paths or control the amount of light by displacement of the mirrors or light shielding plates mounted on the moving plate.

Furthermore, when the drive means is formed by moving and fixed comblike electrodes, their position control is easy, their sticking by direct contact can be avoided, and the drive voltage can be reduced.

Moreover, by forming the support beams a little aslant with respect to the side surfaces of the moving plate, it is possible to obtain a device in which the support beams perform snap action to provide the latch function. Once displaced, the moving plate needs no power supply to stay at the displaced position—this provides increased reliability for abnormality of the drive power supply, for instance.

What is claimed is:

1. A light control device comprising:
   side beams;
   a moving plate having opposed side surfaces;
   at least one pair of support beams extended in opposite directions from said opposed side surfaces of said moving plate in parallel relation to said moving plate and having its tip ends fixed to said side beams, respectively, to support said moving plate in a manner to be elastically displaceable in a plane in which the plate surface of said moving plate lies;
   drive means for driving said moving plate relative to said side beams in said plane in which said plate surface lies; and
   light control means mounted on said moving plate, for controlling incident optical beams in accordance with the displacement of said moving plate by said drive means;
   wherein said moving plate, said support beams, said side beams and said drive means are formed by etching one substrate.

2. The light control device of claim 1, wherein said drive means comprises moving planar electrodes extended from said side surfaces of said moving plate and a fixed planar electrode disposed opposite said moving planar electrodes in common to them.

3. The light control device of claim 1, wherein said drive means comprises moving comblike electrodes extended from said side surfaces of said moving plate and a fixed comblike electrode disposed opposite said moving comblike electrodes in common to them.

4. The light control device of claim 2, wherein:
   said paired support beams are extended from said side surfaces of said moving plate at a predetermined angle of inclination thereto and symmetrically arranged in respect to the center line parallel to the direction of displacement of said moving plate;
   said drive means is disposed on either side of said moving plate in said direction of displacement of said moving plate; and
   said paired support beams are driven by said drive means into snap action.

5. The light control device of claim 3, wherein:
   said paired support beams are extended from said side surfaces of said moving plate at a predetermined angle of inclination thereto and symmetrically arranged in respect to the center line parallel to the direction of displacement of said moving plate;
   said drive means is disposed on either side of said moving plate in said direction of displacement of said moving plate; and
   said paired support beams are driven by said drive means into snap action.

6. The light control device of claim 1, wherein:
   said paired support beams are extended from said side surfaces of said moving plate at a predetermined angle of inclination thereto and symmetrically arranged in respect to the center line parallel to the direction of displacement of said moving plate;
   said drive means comprises plural sets of a thermally expansive member and an energy-conversion mechanism for converting thermal expansion of said thermal expansive member into a pressure in said direction of displacement of said moving plate, said drive means being capable of applying forward and backward pressures to said moving plate; and
   on said moving member being pressed by said energy-conversion mechanism, said support beams performs snap action to drive and displace said moving plate.

7. The light control device of claim 5, wherein said light control means comprises mirrors for changing optical paths of said optical beams when said moving plate is brought to a predetermined position.

8. The light control device of claim 5, wherein said light control means comprises light shielding plates whose transmittance varies in the direction of displacement of said moving plate.

9. The light control device of claim 5, wherein said substrate is a silicon substrate; said silicon substrate is one of silicon layers of a multi-layered $SiO_2$ substrate deposited all over its both sides with silicon layers, and grooves for fixedly receiving optical fibers are cut in the other of said silicon layers.

10. The light control device of claim 4, wherein said light control means comprises mirrors for changing optical paths of said optical beams when said moving plate is brought to a predetermined position.

11. The light control device of claim 4, wherein said light control means comprises light shielding plates whose transmittance varies in the direction of displacement of said moving plate.

12. The light control device of claim 4, wherein said substrate is a silicon substrate; said silicon substrate is one of silicon layers of a multi-layered $SiO_2$ substrate deposited all over its both sides with silicon layers, and grooves for fixedly receiving optical fibers are cut in the other of said silicon layers.

13. The light control device of claim 3, wherein said light control means comprises mirrors for changing optical paths of said optical beams when said moving plate is brought to a predetermined position.

14. The light control device of claim 3, wherein said light control means comprises light shielding plates whose transmittance varies in the direction of displacement of said moving plate.

15. The light control device of claim 3, wherein said substrate is a silicon substrate; said silicon substrate is one of silicon layers of a multi-layered $SiO_2$ substrate deposited all over its both sides with silicon layers, and grooves for fixedly receiving optical fibers are cut in the other of said silicon layers.

16. The light control device of claim 2, wherein said light control means comprises mirrors for changing optical paths of said optical beams when said moving plate is brought to a predetermined position.

17. The light control device of claim 2, wherein said light control means comprises light shielding plates whose transmittance varies in the direction of displacement of said moving plate.

18. The light control device of claim 2, wherein said substrate is a silicon substrate; said silicon substrate is one of silicon layers of a multi-layered $SiO_2$ substrate deposited all over its both sides with silicon layers, and grooves for fixedly receiving optical fibers are cut in the other of said silicon layers.

19. The light control device of claim 1, wherein said light control means comprises mirrors for changing optical paths of said optical beams when said moving plate is brought to a predetermined position.

20. The light control device of claim 1, wherein said light control means comprises light shielding plates whose transmittance varies in the direction of displacement of said moving plate.

21. The light control device of claim 1, wherein said substrate is a silicon substrate; said silicon substrate is one of silicon layers of a multi-layered $SiO_2$ substrate deposited all over its both sides with silicon layers, and grooves for fixedly receiving optical fibers are cut in the other of said silicon layers.

\* \* \* \* \*